July 21, 1964 W. A. REICH 3,141,564

HAND TRUCK

Filed Nov. 20, 1961

INVENTOR.
Walter A. Reich
BY
Hovey, Schmidt, Johnson & Hovey.
ATTORNEYS.

United States Patent Office 3,141,564

Patented July 21, 1964

3,141,564
HAND TRUCK

Walter A. Reich, Kansas City, Mo., assignor to A. Reich & Sons, Inc., Kansas City, Mo., a corporation of Missouri Filed Nov. 20, 1961, Ser. No. 153,565
4 Claims. (Cl. 214—379)

This invention relates to a portable hand truck, and more particularly, to a truck for use in meat handling operations such as take place in packing houses and similar installations.

It is the primary object of this invention to provide a hand truck which may be used to handle quarters and sides of meat without the necessity of the operator manually lifting or handling the meat, the hand truck being designed to move such quarters and sides of meat from and to an overhead conveyor or the like, and to transport the same to a point of storage or transportation.

In this respect, an aim of the invention is to provide a hand truck having a wheeled base and a pair of extensible, upright members carried by the base, the said members being extensible to a raised position, whereby a gripping head, which is carried by said extensible members, may be positioned in such a manner as to be coupled with the meat carcass or the like, thus allowing lowering of the carcass onto the hand truck for transportation.

A yet further object of this invention is to provide a hand truck for use in handling meat carcasses which includes a wheeled base and a pair of extensible, upright members carried by the base, there being an articulated handle assembly interconnecting the base and the upright members, whereby the operator of the hand truck may easily maneuver and position the same with respect to the meat carcass to be handled by the truck.

A yet further aim is to provide a gripping head which includes a pair of jaws adapted to grip the meat carcass, said jaws being swingably mounted upon a supporting plate and there being lever means for actuating the jaws to an open and closed position.

Other objects of the invention include the hydraulic means by which the upright members may be extended upon operation of a pump by the operator of the hand truck; and other details of construction which will become apparent from the following specification and accompanying drawing, wherein.

Figures 1, 2, 3, 4, 5:
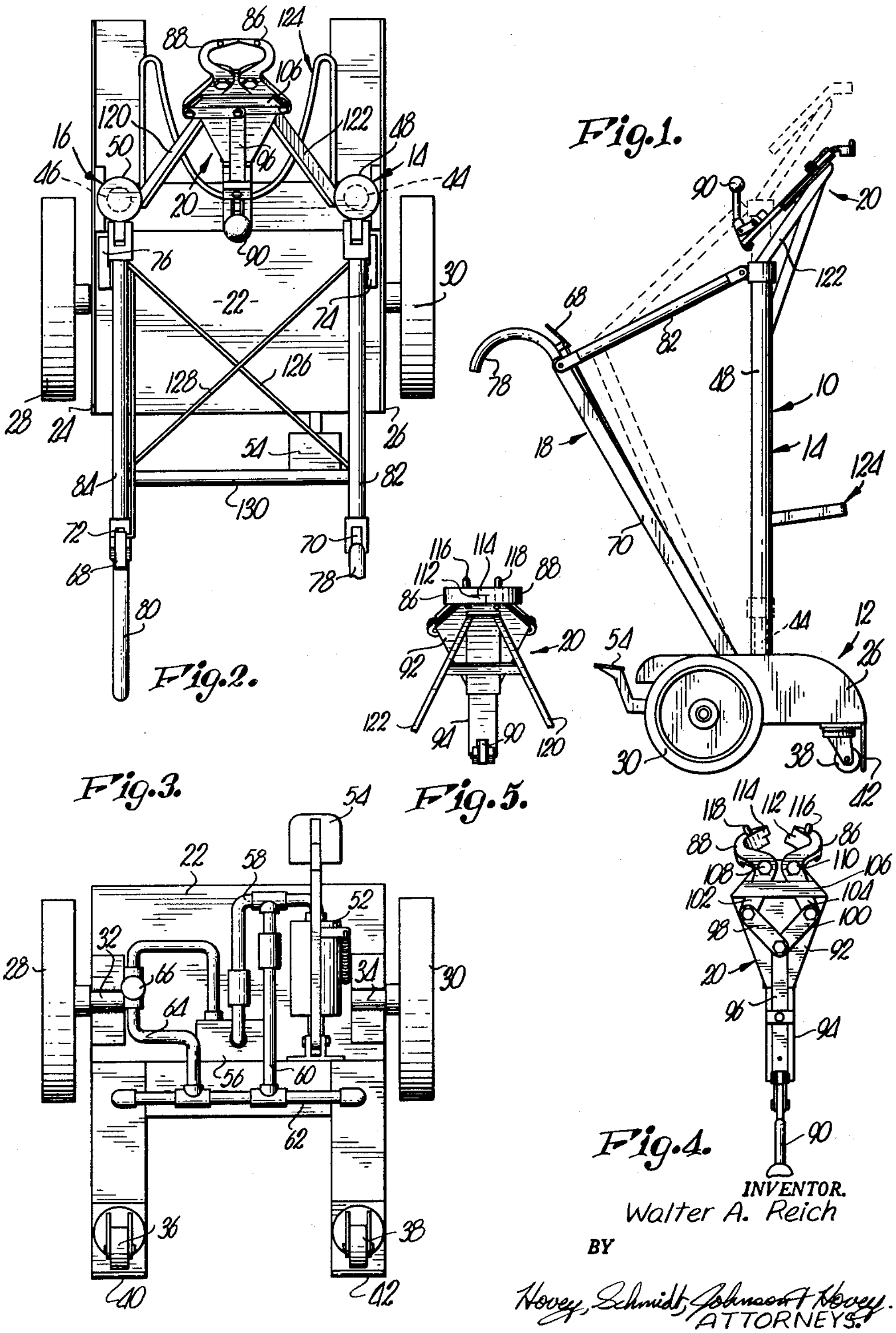
FIGURE 1 is a side elevational view of the hand truck.
FIG. 2 is a top plan view thereof.
FIG. 3 is a bottom plan view thereof.
FIG. 4 is a fragmentary, rear elevational view of the gripping head.
FIG. 5 is a fragmentary, front elevational view of the gripping head.

The hand truck is broadly designated by the numeral 10, and includes as its primary components, a wheeled base 12; a pair of upright, extensible members 14 and 16 carried by the wheeled base 12; an articulated handle assembly 18 interconnecting the base 12 with the upright members 14 and 16; and a gripping head 20 carried by said upright members 14 and 16 at the ends thereof opposite to the base 12.

The wheeled base 12 includes a bottom plate 22 having a pair of upstanding side flanges 24 and 26, whereby to form a bed for the hand truck 10. The bed is supported by a pair of large wheels 28 and 30 secured to bottom plate 22 by means of stub shaft axles 32 and 34, and a pair of caster wheels 36 and 38 placed at the normally forward extremity of the base 12. Disposed adjacent caster wheels 36 and 38 are a pair of legs 40 and 42.

The upright members 14 and 16 are secured to base 12 by means of suitable brackets or the like (not shown), and each of said upright members consists of an inner tube and an outer tube, the inner tubes being fixedly attached to said base and designated 44 and 46 respectively, and the corresponding outer tubes being telescoped over the inner tubes 44 and 46 and designated as 48 and 50 respectively. Thus, each of the upright members 14 and 16 essentially comprises a piston and cylinder assembly, there being means for introducing fluid under pressure into the inner tubes 44 and 46 and the outer tubes 48 and 50 having a piston member which seats within the corresponding inner tubes, whereby, when fluid is introduced into inner tubes 44 and 46, the corresponding outer tubes 48 and 50 will be shifted upwardly with respect to inner tubes 44 and 46. By the same token, when fluid is released from the interior of inner tubes 44 and 46, the outer tubes 48 and 50 will, due to the force of gravity and the weight normally carried thereby, move to a lowered position as is illustrated in the full-lines in FIG. 1.

The means for introducing fluid into inner tubes 44 and 46 comprises a hydraulic assembly carried beneath bottom plate 22 and including, as its essential components, a main pump 52, a piston (not shown) being a part of the main pump 52, and the piston being operable by a foot pedal 54 actuatable by the operator of hand truck 10. Fluid is retained in a main fluid tank 56 which is coupled to pump 52 by means of a line 58, the line 58 having a branch 60 which leads to the main supply pipe 62 serving inner tubes 44 and 46. Thus, upon actuation of pump 52 by pedal 54, fluid is brought from the main tank 56 through line 58; branch 60 and pipe 62 from whence it passes upwardly therethrough to the interior of tubes 44 and 46.

Suitable valves are disposed within line 58 and branch 60, whereby to allow the pumping action as above described. A return line 64 is in communication with pipe 62, the return line 64 having a release valve 66 interposed therein, said release valve being actuatable by a valve release lever 68 which is carried by the handle assembly 18.

Thus, it will be seen that after the upright members 14 and 16 have been elevated or extended through the introduction of fluid into inner tubes 44 and 46 as above described, thereby moving the same to the dotted line position of FIG. 1, said members 14 and 16 may be lowered by actuating release valve 66, thereby allowing the fluid to return through pipe 62, through release valve 66 and back into the fluid tank 56, the valves in branch 60 and line 58 being closed when the fluid is returning to tank 56. Thus, the upright members 14 and 16 may be quickly and easily shifted from one position to another by the operator of the hand truck 10 with a minimum of physical effort. In this respect, it should be noted that uprights 14 and 16 may be halted at any position in their path of travel whereby to adjust the height of the hand truck 10 and more particularly, the gripping head 20 to accommodate the same to the position of a meat carcass upon an overhead conveyor or the like. The upward movement of upright members 14 and 16, and more particularly tubes 48 and 50, is limited by suitable stop members (not shown) which are attached to handle members 70 and 72 and which engage the upper surface of plate 22 as said handle members 70 and 72 shift when the uprights 14 and 16 are extended.

The handle assembly 18 interconnects base 12 with upright members 14 and 16, and consists of a pair of handle members 70 and 72 corresponding to uprights 14 and 16 respectively, said handle members 70 and 72 being pivotally interconnected to base 12 as at 74 and 76, and being provided, adjacent their opposite ends, with suitable grips such as 78 and 80, allowing manipulation of the hand truck by an operator.

Handle assembly 18 also includes a pair of arms 82 and 84 which have one end thereof pivotally attached to corresponding handle members 70 and 72 respectively, and the opposite end thereof pivotally attached to their corresponding uprights 14 and 16 respectively.

Thus, when upright members 14 and 16 are extended upwardly in the manner hereinabove described, the articulated handle assembly 18 moves therewith to the dotted line position shown in FIG. 1 for instance, the handle members 70 and 72 pivoting about points 74 and 76, the arms 82 and 84 pivoting, at the normally outermost ends thereof, about their point of interconnection with handle members 70 and 72, and at their innermost ends about their point of interconnection with uprights 14 and 16.

Through the means hereinabove described, the hand truck 10 may be moved to a position adjacent an overhead conveyor or other type of rack from which a meat carcass may be suspended and, upon such positioning, the uprights 14 and 16 can be extended upwardly to place gripping head 20 in proximal relation to the meat carcass to be handled. Once the gripping head 20 has been so positioned, jaws 86 and 88 of gripping head 20 can be moved to and from a closed position by means of lever 90, said lever 90 being pivotally coupled to a supporting plate 92 which includes a slide block 94, the lever 90 shifting, upon its actuation, a slide bar 96 which is connected at the end thereof opposite lever 90, to a pair of links 98 and 100, said links 98 and 100 being pivotally interconnected at the ends thereof opposite to those attached to slide bar 96 to jaw extensions 102 and 104 respectively. A limiting plate 106 overlies jaw extensions 102 and 104 and said jaw extensions 102 and 104 are pivotally connected to supporting plate 92 as at 108 and 110 respectively, adjacent the normally outermost extremity of said plate 92.

The jaws 86 and 88 are arcuate in configuration and each has an offset portion 112 and 114 respectively, whereby to form a pair of overlapping teeth as best shown in FIG. 5 of the drawing. Disposed adjacent said teeth and on the uppermost surface of said jaws, are a pair of lugs 116 and 118 which serve to hold the meat carcass against shifting movement once it has been disposed over said closed jaws.

The gripping head 20 is braced by suitable members such as 120 and 122 which are secured to upright members 14 and 16 respectively. Disposed intermediate the ends of upright members 14 and 16 and spanning the distance therebetween, is a substantially U-shaped cradle 124 within which the meat carcass may rest when one end thereof is secured to jaws 86 and 88. Strength is added to the hand truck 10 by means of cross braces such as 126 and 128 which interconnect the spaced-apart handle members 70 and 72 and reinforcing bar 130 which likewise interconnects said handle members 70 and 72.

The foregoing construction provides a hand truck 10 which is fully portable and which may be operated by a single individual, the truck 10 being moved primarily upon large wheels 28 and 30 to and from its position of operation in which it is supported by caster wheels 36 and 38 and legs 40 and 42. Once truck 10 has been moved to a point adjacent an overhead conveyor or the like, the pedal 54 is operated whereby to introduce fluid into inner tubes 44 and 46 of upright members 14 and 16, thereby shifting outer tubes 48 and 50 upwardly, said tubes, which carry gripping head 20, thereby moving said gripping head 20 and more particularly, jaws 86 and 88 to a position adjacent an opening which is normally provided in a meat carcass for the insertion of hangers, loops or the like. The jaws 86 and 88 being opened when the gripping head is moved to said position, the same may then be closed through actuation of lever 90 and its associated linkage, whereby the jaws 86 and 88 move to the closed position shown in FIG. 5, and the meat carcass, when released from the overhead conveyor or the like, is suspended from said jaws. The lowermost portion of said carcass will nest within cradle 124 and the hand truck may then be tilted rearwardly and moved upon large wheels 28 and 30 to a position suitable for unloading the carcass.

As is obvious, the position of the carcass may be shifted while it is being carried by the hand truck, and thus all physical labor and direct contact with the meat carcass is eliminated during the shipping, handling and transportation thereof.

Having thus described the invention, what is claimed as new and desired to be secured by Letters Patent is:

1. A hand truck comprising:

(*a*) a wheeled base;

(*b*) a pair of extensible upright members carried by said base each including an inner tube and an outer tube, said outer tube being shiftable with respect to said inner tube;

(*c*) pump means for introducing fluid into said inner tube whereby to cause the shifting of said outer tube;

(*d*) an articulated handle assembly interconnecting said base and said outer tubes;

(*e*) a gripping head carried by said outer tubes, said gripping head including an inclined supporting plate, a pair of jaws lying in a substantially horizontal plane and swingably coupled to said plate, and shiftable linkage for moving said jaws to an open and closed position; and (*f*) a cradle carried between said upright members and spanning the distance therebetween, said cradle being vertically spaced from said base and from said head and located at a point therebetween.

2. A hand truck as set forth in claim 1 wherein said jaws have teeth at their outermost extremities, said teeth overlapping when the jaws are in a closed position.

3. A hand truck comprising:

(*a*) a wheeled base;

(*b*) a pair of extensible upright members carried by said base, each upright member including an inner tube and an outer tube, said outer tube being shiftable with respect to said inner tube;

(*c*) pump means for introducing fluid into said inner tube whereby to cause upward shifting movement of said outer tube;

(*d*) release mechanism for evacuating the fluid from said inner tube whereby to allow downward shifting movement of said outer tube;

(*e*) an articulated handle assembly interconnecting said outer tube with said base, said handle assembly including a handle member corresponding to each upright member, each handle member having one end thereof pivotally coupled to said base, and an arm pivotally attached at one end thereof to the opposite end of each handle member, the opposite end of each of said arms being pivotally coupled to the outer tube of its corresponding upright; and (*f*) a gripping head carried by said outer tubes adjacent the ends thereof opposite to said base, said head being shiftable with said outer tubes, said gripping head including an inclined supporting plate, a slide block carried by said supporting plate at one extremity thereof, a pair of jaws swingably carried by said supporting plate at the opposed extremity thereof, said jaws lying in a substantially horizontal plane, an operating lever carried by said slide block, and linkage interconnecting said lever and said jaws whereby the latter may be moved to an open and closed position.

4. A hand truck as set forth in claim 3, there being a cradle vertically spaced from said gripping head, carried by said outer tubes intermediate the ends thereof, spanning the distance therebetween and shiftable therewith, whereby said head and said tube may retain their predetermined, vertically spaced relationship.

(References on following page)

References Cited in the file of this patent

UNITED STATES PATENTS

| | | |
|---|---|---|
| 2,272,447 | Traxel | Feb. 10, 1942 |
| 2,743,833 | Peterson | May 1, 1956 |
| 2,832,630 | Sterling | Apr. 29, 1958 |
| 2,903,147 | Davis | Sept. 8, 1959 |
| 2,946,407 | Reich | July 26, 1960 |
| 3,021,169 | Harry | Feb. 13, 1962 |

FOREIGN PATENTS

| | | |
|---|---|---|
| 5,641 | Sweden | Nov. 24, 1894 |
| 627,879 | Canada | Sept. 26, 1961 |